April 26, 1955
H. E. JORGENSON
2,707,263
VOLTAGE AND CURRENT REGULATOR
Filed April 7, 1952
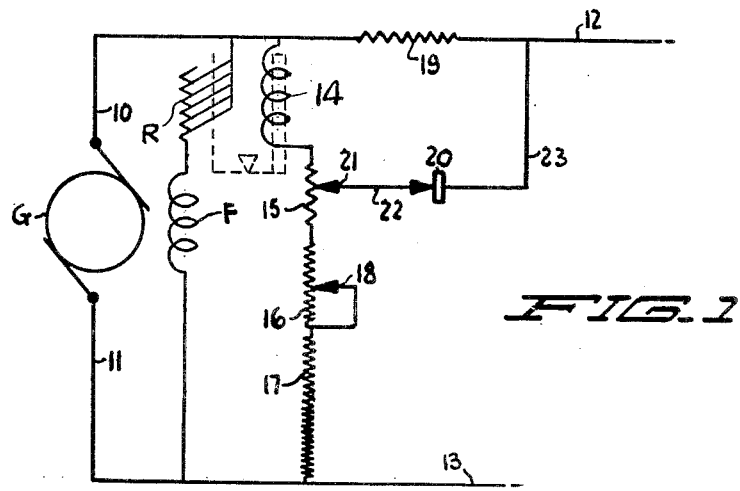
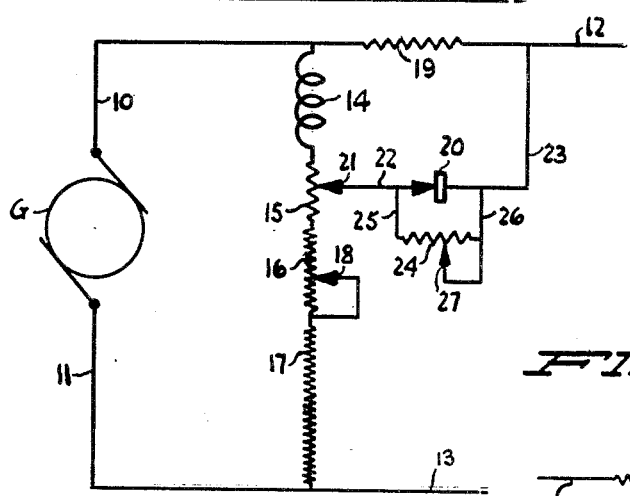
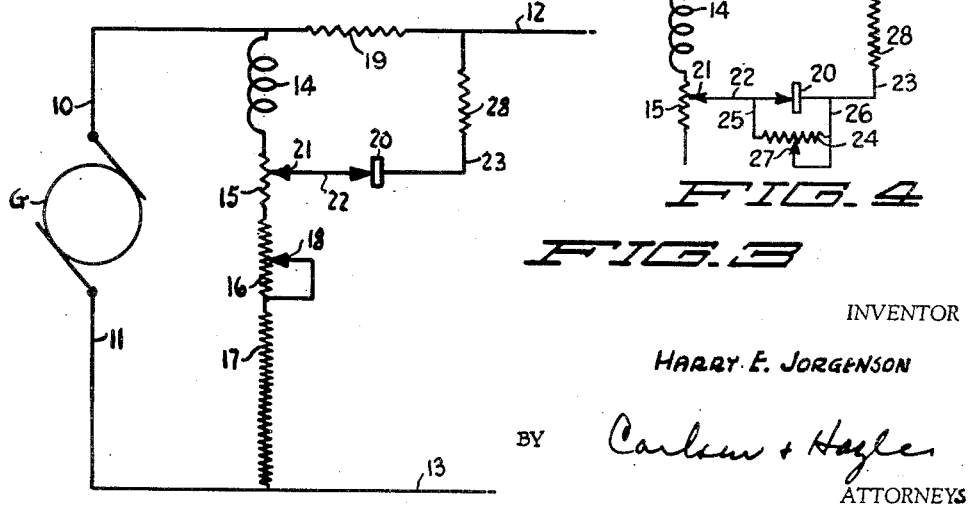
INVENTOR
HARRY E. JORGENSON
BY *Carlsen + Hoyle*
ATTORNEYS United States Patent Office 2,707,263
Patented Apr. 26, 1955

2,707,263

VOLTAGE AND CURRENT REGULATOR

Harry E. Jorgenson, Minneapolis, Minn., assignor to D. W. Onan and Sons, Inc., Minneapolis, Minn., a corporation of Minnesota Application April 7, 1952, Serial No. 280,944

8 Claims. (Cl. 322—25)

This invention relates to improvements in controls for direct current generators which run at variable speeds and such as are widely used as portable power plants, battery chargers and the like.

For satisfactory operation it is necessary to control both the terminal voltage and current output of such generators, to meet the varying load conditions; and circuits for regulating voltage and for regulating current are known and in use. It is the primary object of my invention, however, to control these two functions in a single regulating circuit in a simple and very satisfactory manner. Another object is to provide a combination circuit for voltage-current regulation which may be used in an exceedingly simple form or with additions for varying its characteristics and for protection against reverse polarity connections, all as will be fully set forth hereinafter.

These and other more detailed and specific objects will be disclosed in the course of the following specification, reference being had to the accompanying drawings, in which—

Fig. 1 is a schematic wiring diagram of the basic voltage-current regulator circuit of my invention, showing also the field and regulator unit.

Fig. 2 shows the same circuit, omitting the field and regulator unit, but with the addition of a resistor to introduce a drooping characteristic into the regulating function.

Fig. 3 is a circuit similar to Figs. 1 and 2 but with the addition of a protective resistor to protect the regulator should reverse polarity connections be made.

Fig. 4 is a view on a somewhat reduced scale of a part of the circuit showing both the droop resistor of Fig. 2 and protective resistor of Fig. 3.

Referring now more particularly and by reference characters to the drawing, I have shown in Fig. 1 a basic simplified circuit for obtaining voltage and current regulation of the output of a direct current generator, denoted generally at G. The individual basic circuit for voltage regulation alone will first be discussed in order best to bring out the novelty in my improved dual function regulator.

The generator G is loaded across the conductors 10 and 11 and conductors 12 and 13 leading to the load (not shown). Forming part of the circuit is a voltage regulator coil 14, a regulating resistor R and the field F, which parts are well known in the art and which control the field current and hence the output of the generator. Since the field F and resistor R are entirely conventional, they are shown only in Fig. 1. The voltage regulator coil 14 is connected in series with three resistors, designated at 15, 16 and 17, and the coil and resistors are connected across the load circuit of the generator. The resistor 16 is the voltage control, being of the rheostatic type with a slider 18 for varying the effective value of the resistance in the circuit. Adjustment of the resistor 16 will increase or decrease the current flowing through the regulator coil 14 and as this current is varied the terminal voltage of the generator will be controlled. This, then, is the basic voltage regulation circuit and is, per se, well known in the art.

Current regulation, on the other hand, is accomplished by placing a regulating resistor 19 in series with the output or load, in this case in the conductor 12, and the voltage drop across this resistor as the current flows to the load is used to influence the voltage regulator coil 14. For this purpose the resistor 19 and coil 14 are connected in parallel and as the load increases the rising voltage drop across the resistor affects the regulator coil in such fashion as to achieve control of the current output of the generator. This basic manner of current regulation is also, per se, old in the field.

My invention combines the essence of these two regulating circuits with the addition of a rectifier 20, such as a selenium rectifier, in order to attain both voltage and current regulation in a simple and practical regulator circuit. For this purpose the aforesaid resistor 15 is of the potentiometer type with a slider 21 and the rectifier 20 is connected by a conductor 22 to this slider 21 and by another conductor 23 is connected to the load or output end of the resistor 19, this completing the basic circuit of my invention.

In operation the potentiometer 15 applies a reverse potential voltage on the rectifier 20 at no load, this potential being the voltage drop across that portion of the resistor between the slider 21 and the upper or coil end of the resistor, plus of course the voltage drop across the coil 14 itself. Of course, the polarity at slider 21 is opposite to that at the upper end of coil 14. Now as the load increases the increasing voltage drop across the resistor 19 as the current increases builds up and approaches the magnitude of this reverse voltage and finally as this increasing voltage exceeds such reverse voltage the rectifier 20 will begin to conduct current, which current is applied to the regulator coil 14 to bring about current regulation as aforesaid. I find that the rectifier will begin to conduct current and regulate current output from the generator when the voltage drop across the resistor 19 exceeds the reverse voltage across the coil 14 and upper part of potentiometer 15 by about one-half volt.

The setting of the slider 21 will determine the point at which current regulation takes place, since this slider varies the amount of resistance 15 in the reverse voltage circuit with coil 14, and adjustment may be made to introduce current regulation at whatever load conditions desired. Adjustment of the slider 18 still is used as before to regulate voltage output and the two sliders 18 and 21 will thus be seen to be the only manual controls necessary for the practical regulation of both voltage and current. It is important to note, however, that the values or resistances of the resistors 16 and 17 are high as compared to the combined resistance of the potentiometer 15 and regulator coil 14 and therefore have little influence on the current regulation when the rectifier 20 is conducting current. As an example, but not as a limitation, the circuit has been successfully employed with the variable resistor 16 ten times the resistance of resistor 15, and the fixed resistor 17 thirty times the value of resistor 15.

I regard as new that portion of the circuit embodying the resistors 15 and 19, coil 14 and rectifier 20 arranged as shown in conjunction with other necessary elements and operative to control the point at which the voltage drop across resistor 19 causes the rectifier to conduct current, such control being of course by the variation in the reverse potential voltage applied to the rectifier at no load by the adjustment of the slider 21 on resistor 15. The two controls (resistors 15 and 16) may be adjusted in various ways to provide different generator output characteristics and to meet different load conditions, as for example a high voltage-high current output or a high voltage-low current output; a nominal or mid-range voltage and current output; and a low voltage-low current or low voltage-high current output, by the proper, relative adjustments of the controls.

Increasing load, of course, causes some slight falling off of potential in equipment of this nature and this drooping characteristic may be controlled by the addition to the basic circuit of Fig. 1 of another rheostatic type of resistor 24, as seen in Fig. 2. This droop resistor 24, as it will be called, is connected by conductors 25 and 26 across the rectifier 20 and has a slider 27 for adjusting the amount of effective resistance in circuit. At no load, with the rectifier 20 not conducting current, this resistor 24 is across the regulator coil 14 to all practical purposes and the current flowing through the coil is accordingly reduced and the voltage raised by an amount depending upon the value of the droop resistor. As the load increases this effect of the droop resistor diminishes until it has no effect at all as the rectifier begins to conduct current and regulate current output from the generator. The voltage regulation, as measured percentagewise, increases as the value of the droop resistor is decreased.

The voltage regulator elements of the circuit would be damaged by reverse polarity connections between the generator and its load if made by mistake, but the circuit of Fig. 3 provides protection against such mishap by the provision of a limiting or protective resistor 28 to the circuit of Fig. 1. This resistor 28 is connected in series with the rectifier 20, being as here shown interposed in the conductor 23 and functions to limit the maximum voltage to any desired and safe value. The larger the value of this limiting resistor 28 the greater the limitation placed upon reverse voltage which may occur in case of reverse polarity connections but a value may be selected which will offer effective protection without undesirable limitation of the load voltage under proper operating conditions.

In Fig. 4 I have shown a circuit with both the droop and protective resistors, identifying the same parts by the same numerals as used in Figs. 2 and 3, and it will be apparent that both such resistors may be used wherever desired.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For regulating the voltage and current output of a direct current generator having a load circuit and a regulating coil and a pair of adjustable resistors connected with said coil across said load circuit with one of said resistors adjustable to control current through the coil and thereby to regulate the voltage output of the generator, the improvement comprising a series resistor connected in one side of the load circuit, and a rectifier connected across the series resistor and the coil and a part of the other adjustable resistor for regulating current output of the generator.

2. For regulating the voltage and current output of a direct current generator having a load circuit and a regulating coil and a pair of adjustable resistors connected with said coil across said load circuit with one of said resistors adjustable to control current through the coil and thereby to regulate the voltage output of the generator, the improvement comprising a series resistor connected in one side of the load circuit, and a selenium rectifier connected across the series resistor and the coil and a part of the other adjustable resistor for regulating current output of the generator.

3. For regulating the voltage and current output of a direct current generator having a load circuit and a regulating coil and a pair of adjustable resistors connected with said coil across said load circuit with one of said resistors adjustable to control current through the coil and thereby to regulate the voltage output of the generator, the improvement comprising a series resistor connected in one side of the load circuit, a rectifier connected across the series resistor and the coil and a part of the other adjustable resistor for regulating current output of the generator, and an adjustable droop resistor connected across said rectifier for adjusting the droop characteristics of the regulator.

4. For regulating the voltage and current output of a direct current generator having a load circuit and a regulating coil and a pair of adjustable resistors connected with said coil across said load circuit with one of said resistors adjustable to control current through the coil and thereby to regulate the voltage output of the generator, the improvement comprising a series resistor connected in one side of the load circuit, a rectifier connected across the series resistor and the coil and a part of the other adjustable resistor for regulating current output of the generator, and a protective resistor connected between the load and rectifier for protecting the regulator against reverse polarity connections.

5. For regulating the voltage and current output of a direct current generator having a load circuit and a regulating coil and a pair of adjustable resistors connected with said coil across said load circuit with one of said resistors adjustable to control current through the coil and thereby to regulate the voltage output of the generator, the improvement comprising a series resistor connected in one side of the load circuit, a rectifier connected across the series resistor and the coil and a part of the other adjustable resistor for regulating current output of the generator, an adjustable resistor connected in parallel with the rectifier for controlling the droop characteristics of the regulator, and a protective resistor connected between the load and the rectifier for protecting the regulator against reverse polarity connections.

6. For regulating the voltage-current output of a direct current generator having a load circuit and a regulating coil and a potentiometer resistor and a rheostatic resistor connected with said coil across the load circuit with the rheostatic resistor adjustable to vary the current through the coil and thereby regulate the voltage output of the generator, and a current regulating resistor in the load circuit, the improvement comprising a rectifier connected between the load end of said current regulating resistor and the slider of said potentiometer, and a protective resistor interposed between the load end of the current regulating resistor and the rectifier.

7. For regulating the voltage-current output of a direct current generator having a load circuit and a regulating coil and a potentiometer resistor having a slider and a rheostatic resistor connected in that order from one side of the load circuit to the other and a series resistor between the coil and load on one side of the load circuit, the improvement consisting of a selenium rectifier connected between the slider of said potentiometer resistor and the load end of the series resistor.

8. For regulating the voltage-current output of a direct current generator having a load circuit and a regulating coil and a potentiometer resistor having a slider and a rheostatic resistor connected in that order from one side of the load circuit to the other and a series resistor between the coil and load on one side of the load circuit; the improvement consisting of a selenium rectifier connected between the slider of said potentiometer resistor and the load end of the series resistor, a variable resistor connected in parallel with the rectifier, and a reverse polarity protective resistor connected in series with the rectifier between the rectifier and the load.

References Cited in the file of this patent

UNITED STATES PATENTS

| Number | Name | Date |
|---|---|---|
| 1,077,792 | Bralley | Nov. 4, 1913 |
| 1,341,492 | Bossu | May 25, 1920 |
| 1,789,145 | Livingston | Jan. 13, 1931 |
| 1,789,146 | Livingston | Jan. 13, 1931 |
| 1,870,064 | Nickle | Aug. 2, 1932 |
| 2,066,919 | West | Jan. 5, 1937 |
| 2,075,105 | Evans | Mar. 30, 1937 |
| 2,076,962 | O'Hagan | Apr. 13, 1937 |
| 2,095,674 | O'Hagan | Oct. 12, 1937 |
| 2,282,344 | Ruben | May 12, 1942 |
| 2,282,651 | Haberberger | May 12, 1942 |
| 2,427,809 | Rady et al. | Sept. 23, 1947 |

FOREIGN PATENTS

| 472,472 | Great Britain | Sept. 20, 1937 |